(12) United States Patent
Williamson, Jr. et al.

(10) Patent No.: US 7,597,149 B2
(45) Date of Patent: Oct. 6, 2009

(54) SAFETY VALVE WITH EXTENSION SPRINGS

(75) Inventors: Jimmie R. Williamson, Jr., Carrollton, TX (US); James D. Vick, Jr., Dallas, TX (US); Abram Galindo, Dallas, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 156 days.

(21) Appl. No.: 11/004,471

(22) Filed: Dec. 3, 2004

(65) Prior Publication Data

US 2006/0118307 A1 Jun. 8, 2006

(51) Int. Cl.
*E21B 34/10* (2006.01)
(52) U.S. Cl. .................. 166/332.8; 166/373; 166/319
(58) Field of Classification Search ............... 166/321, 166/373, 386, 320, 325, 332.8, 319
See application file for complete search history.

(56) References Cited

U.S. PATENT DOCUMENTS

| 2,064,247 | A | | 4/1934 | Evans |
| 2,711,755 | A | | 6/1955 | Owen |
| 2,780,290 | A | | 2/1957 | Natho |
| 3,356,145 | A | | 12/1967 | Fredd |
| 4,128,106 | A | | 12/1978 | Abercrombie |
| 4,340,088 | A | | 7/1982 | Geisow |
| 4,411,316 | A | | 10/1983 | Carmody |
| 5,137,090 | A | | 8/1992 | Hare et al. |
| 5,159,981 | A | | 11/1992 | Le |
| 5,310,005 | A | | 5/1994 | Dollison |
| 5,358,053 | A | | 10/1994 | Akkerman |
| 5,411,096 | A | * | 5/1995 | Akkerman ............ 166/321 |
| 5,564,675 | A | | 10/1996 | Hill, Jr. et al. |
| 6,328,062 | B1 | | 12/2001 | Williams et al. |
| 6,957,703 | B2 | * | 10/2005 | Trott et al. ............ 166/332.8 |
| 2003/0000582 | A1 | | 1/2003 | Jackson |
| 2003/0155131 | A1 | | 8/2003 | Vick, Jr. |
| 2005/0039922 | A1 | * | 2/2005 | Vick et al. ............ 166/332.8 |

FOREIGN PATENT DOCUMENTS

| GB | 336323 | | 10/1930 |
| GB | 772690 | | 4/1957 |
| GB | 811237 | | 4/1959 |
| GB | 811237 | A | 4/1959 |
| GB | 2405165 | A | 2/2005 |

OTHER PUBLICATIONS

Robert Norton, Machine Design: An Integrated Approach, 1996, Prentice Hall, p. 827.*

(Continued)

*Primary Examiner*—Jennifer H Gay
*Assistant Examiner*—Brad Harcourt
(74) *Attorney, Agent, or Firm*—Marlin R. Smith (57) ABSTRACT

A safety valve with extension springs. In a described embodiment, a valve for use in a subterranean well includes a closure member having open and closed positions. A structure displaces to cause the closure member to displace between the open and closed positions. A biasing device has a length which decreases as the structure displaces to cause the closure member to displace toward the closed position.

31 Claims, 8 Drawing Sheets

OTHER PUBLICATIONS

U.K. Search Report for GB0417116.1.
U.S. Appl. No. 10/642,801; filed Aug. 18, 2003.
Baker Oil Tools, "Baker 'M' Series Non-Elastomeric Valves" informational publication, undated.
Office Action for U.S. Appl. No. 10/642,801 dated Jul. 18, 2005.
Search Report for PCT/US2005/043099.
Written Opinion for PCT/US2005/043099.
International Preliminary Report on Patentability for PCT/US2005/043099.
Examination Report issued Sep. 19, 2008, for UK Patent Application Serial No. GB0711319.4, 1 page.
International Preliminary Report on Patentability issued Jun. 14, 2007, for International Patent Application Serial No. PCT/US05/43099, 7 pages.
Examination Report issued Apr. 23, 2009, for UK Patent Application Serial No. 0711319.4, 1 page.

* cited by examiner

SAFETY VALVE WITH EXTENSION SPRINGS

BACKGROUND

The present invention relates generally to operations performed and equipment utilized in conjunction with a subterranean well and, in an embodiment described herein, more particularly provides a safety valve which utilizes extension springs in its operation.

It is known to use a compression spring to bias a safety valve toward its closed position. However, in the quest to provide safety valves which will reliably operate at increased depths in a well, and which have reduced wall thicknesses to permit increased flow areas therethrough, some limitations of compression springs make these goals difficult to attain. For example, one limitation of compression springs is that they expand when they are compressed, and so additional space must be provided in the wall thickness of a safety valve to allow for this expansion.

Therefore, it may be seen that valves, such as safety valves, could benefit from improved methods of operation. These methods could use other types of biasing devices to replace or supplement the biasing forces produced by compression springs. Such improvements could be useful in other applications, as well.

SUMMARY

In carrying out the principles of the present invention, in accordance with an embodiment thereof, a safety valve is provided which utilizes one or more extension springs to displace a closure member between open and closed positions. Use of the extension springs permits a housing assembly of the valve to have a thinner sidewall thickness for a given setting depth.

In one aspect of the invention, a valve for use in a subterranean well is provided which includes a closure member having open and closed positions. A structure displaces to cause the closure member to displace between the open and closed positions. A biasing device has a length which decreases as the structure displaces to cause the closure member to displace toward the closed position.

In another aspect of the invention, a safety valve is provided which includes a closure member having open and closed positions, a structure which is operative to displace the closure member between the open and closed positions, and at least one extension spring which biases the structure to displace the closure member toward the closed position.

In yet another aspect of the invention, a safety valve is provided which includes a closure member having open and closed positions, a structure which displaces to thereby displace the closure member between the open and closed positions, and a first biasing device which biases the structure in a direction. A length of the first biasing device decreases as the structure displaces in the direction. A second biasing device may be provided to bias the structure in the direction, with a length of the second biasing device increasing as the structure displaces in the direction.

These and other features, advantages, benefits and objects of the present invention will become apparent to one of ordinary skill in the art upon careful consideration of the detailed description of representative embodiments of the invention hereinbelow and the accompanying drawings.

DETAILED DESCRIPTION

Figure 1:
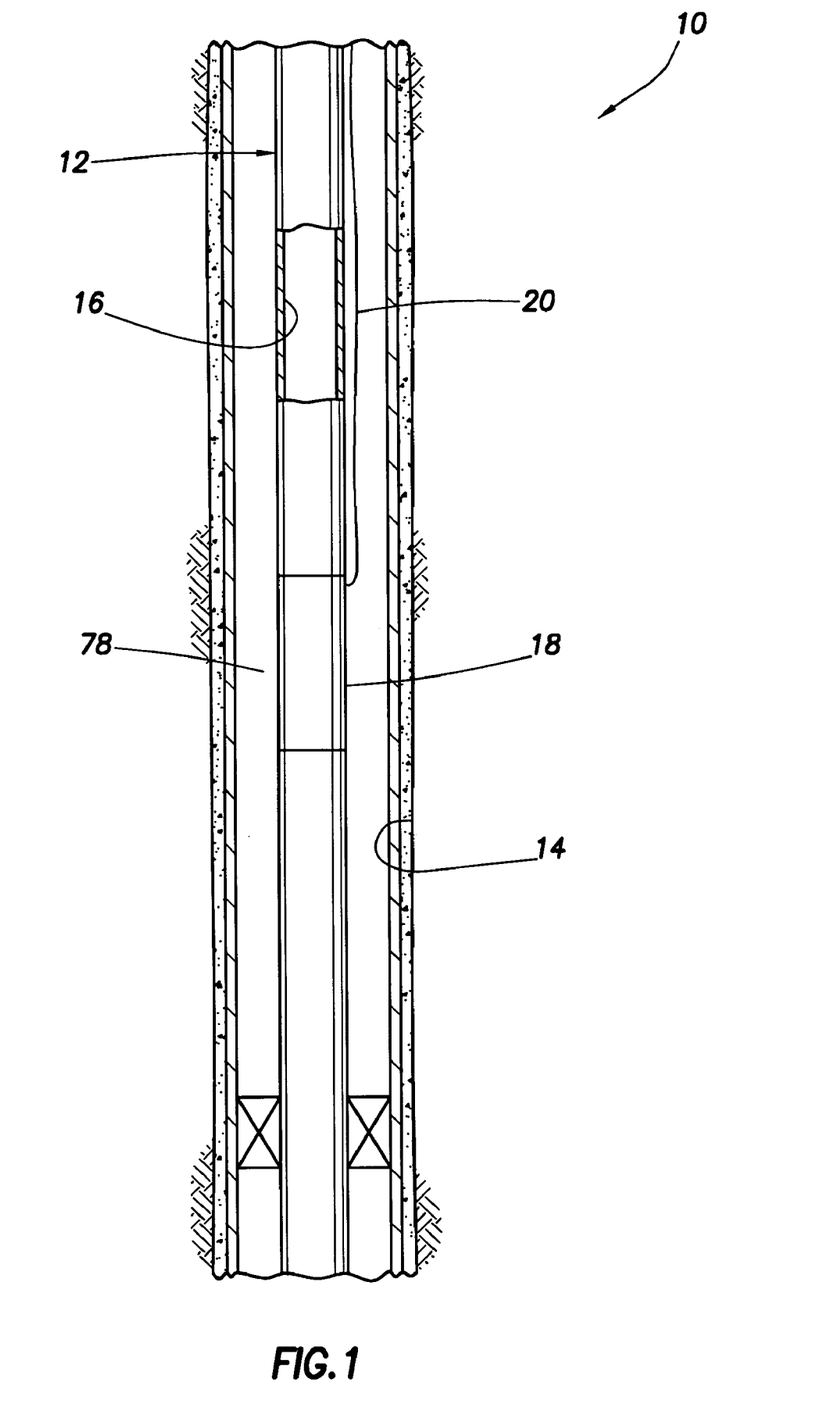
FIG. 1 is a schematic cross-sectional view of a valve system embodying principles of the present invention.

Representatively illustrated in FIG. 1 is a valve system 10 which embodies principles of the present invention. In the following description of the system 10 and other apparatus and methods described herein, directional terms, such as "above", "below", "upper", "lower", etc., are used for convenience in referring to the accompanying drawings. Additionally, it is to be understood that the various embodiments of the present invention described herein may be utilized in various orientations, such as inclined, inverted, horizontal, vertical, etc., and in various configurations, without departing from the principles of the present invention. The embodiments are described merely as examples of useful applications of the principles of the invention, which are not limited to any specific details of these embodiments.

As depicted in FIG. 1, a production tubing string 12 is installed in a wellbore 14. The tubing string 12 has an interior longitudinal flow passage 16 for flowing fluids to the surface or another location. Interconnected in the tubing string 12 is a safety valve 18 for shutting off flow through the passage 16, for example, in the event of an emergency.

Operation of the safety valve 18 is controlled by means of one or more lines 20 connected to the safety valve. Pressure in the line(s) 20 is used to displace a piston (not visible in FIG. 1) to open the safety valve 18. Preferably, an absence of applied pressure in the line(s) 20 will cause the safety valve 18 to close and prevent flow through the passage 16.

Note that the system 10 is described herein as merely one example of an application of the principles of the invention. These principles are not limited to any specific details of the system 10 as depicted in FIG. 1. For example, a valve other than a safety valve (such as a sliding sleeve valve, downhole choke, etc.) could be used, it is not necessary for the valve to be interconnected in a production tubing string, or for the lines to extend external to the tubing string, etc. Furthermore, the principles of the invention could be used in safety valves which are not operated by application of pressure, such as electrically operated safety valves.

Figure 2A:
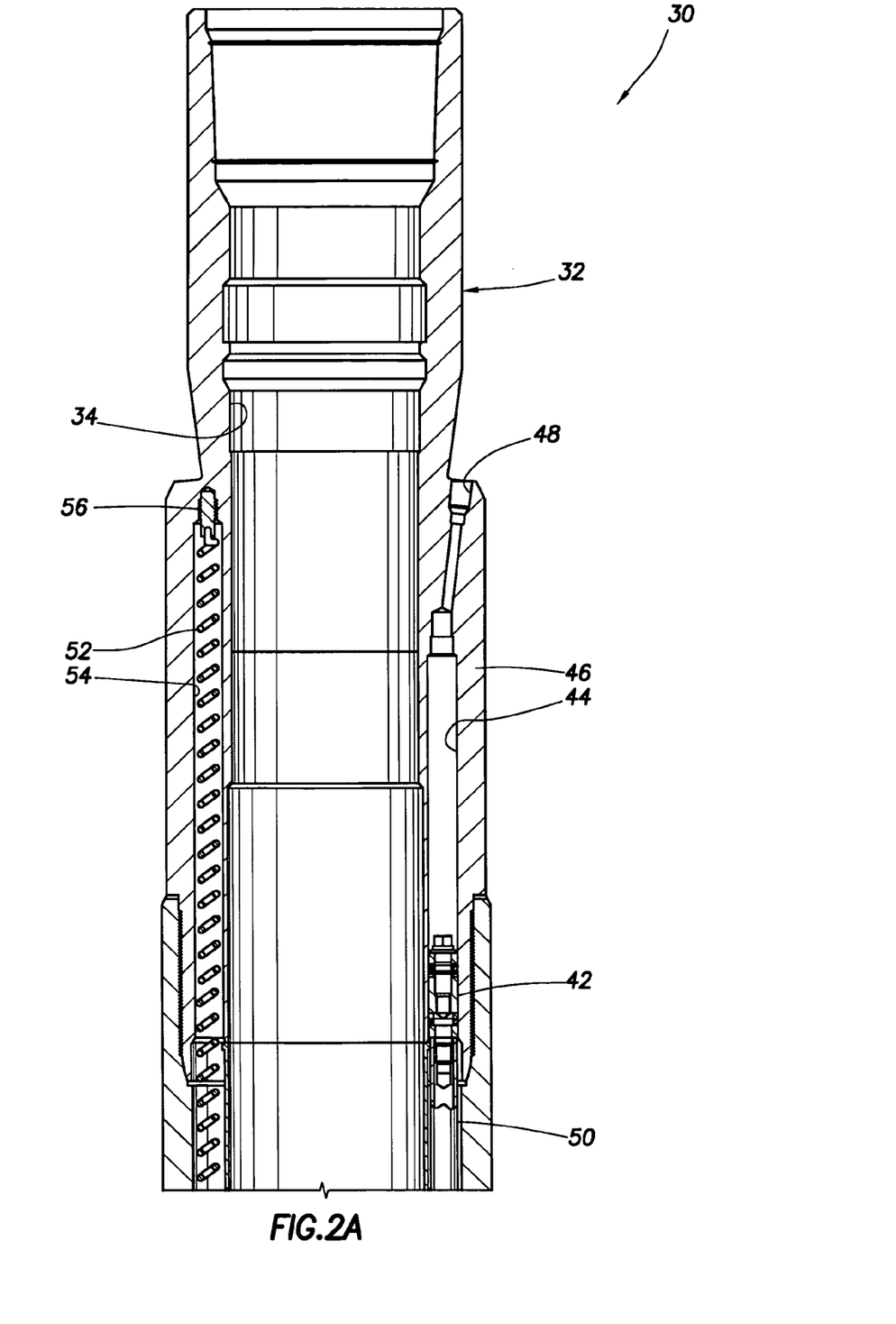
FIGS. 2A & B are enlarged scale cross-sectional views of successive axial sections of a safety valve which may be used in the system of FIG. 1, the safety valve embodying principles of the present invention.
Figure 2B:
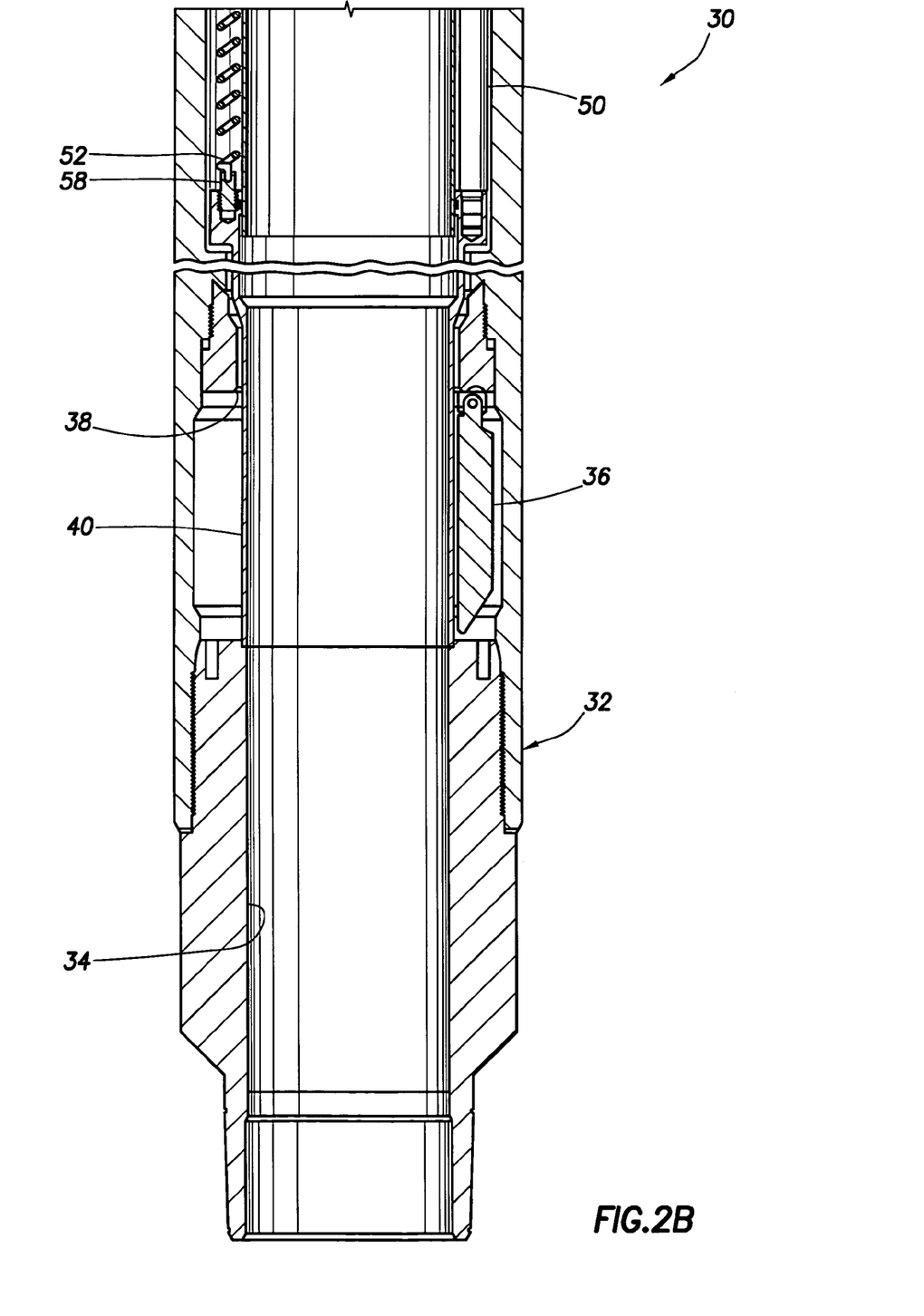

Referring additionally now to FIGS. 2A & B, a safety valve 30 is representatively illustrated. The safety valve 30 could be used for the safety valve 18 in the system 10, or it could be used in other applications.

The safety valve 30 includes an outer generally tubular housing assembly 32 with a flow passage 34 extending generally longitudinally therethrough. If the safety valve 30 is used in the system 10, the flow passage 34 becomes a section of the flow passage 16 in the tubing string 12.

A flapper closure member 36 is pivotably mounted in the housing assembly 32 adjacent a seat 38 encircling the flow passage 34. As shown in FIG. 2B, the flapper 36 is in an open position in which flow is permitted through the passage 34. However, if the flapper 36 is pivoted upward so that it sealingly engages the seat 38, then flow through the passage 34 (at least in an upward direction as viewed in FIGS. 2A & B) will be prevented.

Note that other types of closure members could be used instead of the flapper 36. For example, a ball of the type used in a ball valve, a sleeve of the type used in a sliding sleeve valve, a gate of the type used in a gate valve, a needle or cage of the type used in a downhole choke, or any other type of closure member could be used. Thus, it will be appreciated that the principles of the invention are not limited to use of a flapper closure member, or use of any particular type of valve.

The flapper 36 is pivoted to the open position, and maintained in the open position, by a generally tubular flow tube structure 40 reciprocably disposed in the housing assembly 32. The passage 34 extends through the flow tube 40 so that, as the flow tube maintains the flapper 36 in its open position, fluid flow is permitted through the flow tube and the remainder of the passage.

The flow tube 40 is displaced to its downwardly disposed position as depicted in FIG. 2B by a pressure differential created across a piston 42 shown in FIG. 2A. The piston 42 is reciprocably received in an opening 44 formed in a sidewall 46 of the housing assembly 32. A line (such as the line(s) 20 of FIG. 1) may be connected to the housing assembly 32 at a port 48 to apply pressure to an upper side of the piston 42. A lower side of the piston 42 is exposed to pressure in the passage 34.

When the pressure applied to the port 48 exceeds pressure in the passage 34, the piston 42 will apply a downwardly directed biasing force to the flow tube 40 via a rod 50 interconnected between the piston and the flow tube. When pressure in the passage 34 is equal to pressure applied at the port 48, no biasing force results from the piston 42. When pressure in the passage 34 exceeds pressure applied at the port 48, the piston 42 will apply an upwardly directed biasing force to the flow tube via the rod 50.

Note that, although only one piston 42 and associated opening 44 and rod 50 are depicted in FIGS. 2A & B, it should be understood that there could alternatively be multiple pistons, openings and rods in the safety valve 30. These multiple pistons 42 and openings 44 could be circumferentially distributed in the sidewall 46 of the housing assembly 32. Alternatively, an annular piston could be used instead of the cylindrically-shaped piston 42, in which case the piston could be integrally formed with the flow tube 40, or at least attached at an upper portion thereof.

Thus, it will be appreciated that any type of piston may be used in keeping with the principles of the invention. And, since the principles of the invention are also applicable to well tools which are not operated by application of pressure (such as electrically operated safety valves), it is not even necessary to use a piston at all.

The flow tube 40 is also biased upwardly by an extension spring biasing device 52. The extension spring 52 is attached to the housing assembly 32 in an opening 54 positioned in the sidewall 46 laterally opposite the piston opening 44. An upper end of the spring 52 is attached to a fastener 56 threaded into an upper end of the opening 54. A lower end of the spring 52 is attached to the flow tube 40 by means of another fastener 58 threaded into an upper end of the flow tube.

Although only one spring 52 and associated opening 54 are depicted in FIGS. 2A & B, there could be multiple springs and openings circumferentially distributed in the sidewall 46 of the housing assembly 32. Alternatively, one or more extension springs could encircle the flow passage 34. Other types of biasing devices, such as other types of springs, a relatively low pressure chamber, etc. could be used in place of, or in addition to, the spring 52. Thus, the principles of the invention are not limited to use of any particular type of biasing device.

A length of the spring 52 decreases as the flow tube 40 displaces upwardly. A length of the spring 52 increases as the flow tube 40 is displaced downwardly by the piston 42. As the length of the spring 52 increases, the upwardly directed biasing force exerted by the spring on the flow tube 40 also increases. For this reason, a sufficient pressure differential from above to below the piston 42 must be maintained in order to keep the flow tube 40 in its downwardly disposed position and prevent it from displacing upwardly.

This would be accomplished in the system 10 by maintaining a pressure in the line 20 connected to the port 48 which exceeds the pressure in the passage 34 by a sufficient amount so that the downwardly directed biasing force exerted by the piston 42 exceeds the upwardly biasing force exerted by the spring 52. If pressure in the line 20 decreases (for example, due to a catastrophic event, such as the line being severed, or due to testing or maintenance, etc.), then the force exerted by the spring 52 will displace the flow tube 40 to its upwardly disposed position in which it will no longer maintain the flapper 36 in its open position, and the flapper will be permitted to pivot upward and seal against the seat 38 in its closed position.

One advantage of using the extension spring 52 is that it does not expand when it applies the increasing upwardly directed biasing force to the flow tube 40 as the flow tube is downwardly displaced. Thus, the thickness of the sidewall 46 does not have to be increased to allow for this expansion. One advantage of positioning the extension spring 52 in the sidewall 46 at a same longitudinal position along the housing assembly 32 as the piston 42 is that a length of the safety valve 30 can be minimized. Another advantage of using the extension spring 52 is that it can be used to adjust a maximum setting depth or operating pressure of the safety valve 30 by adjusting the upwardly biasing force applied to the flow tube 40.

Referring additionally now to FIGS. 3A-D, another safety valve 60 is representatively illustrated. The safety valve 60 may be used for the safety valve 18 in the system 10, or it may be used in any other application. The safety valve 60 achieves at least the same advantages described above for the safety valve 30.

Figure 3A:
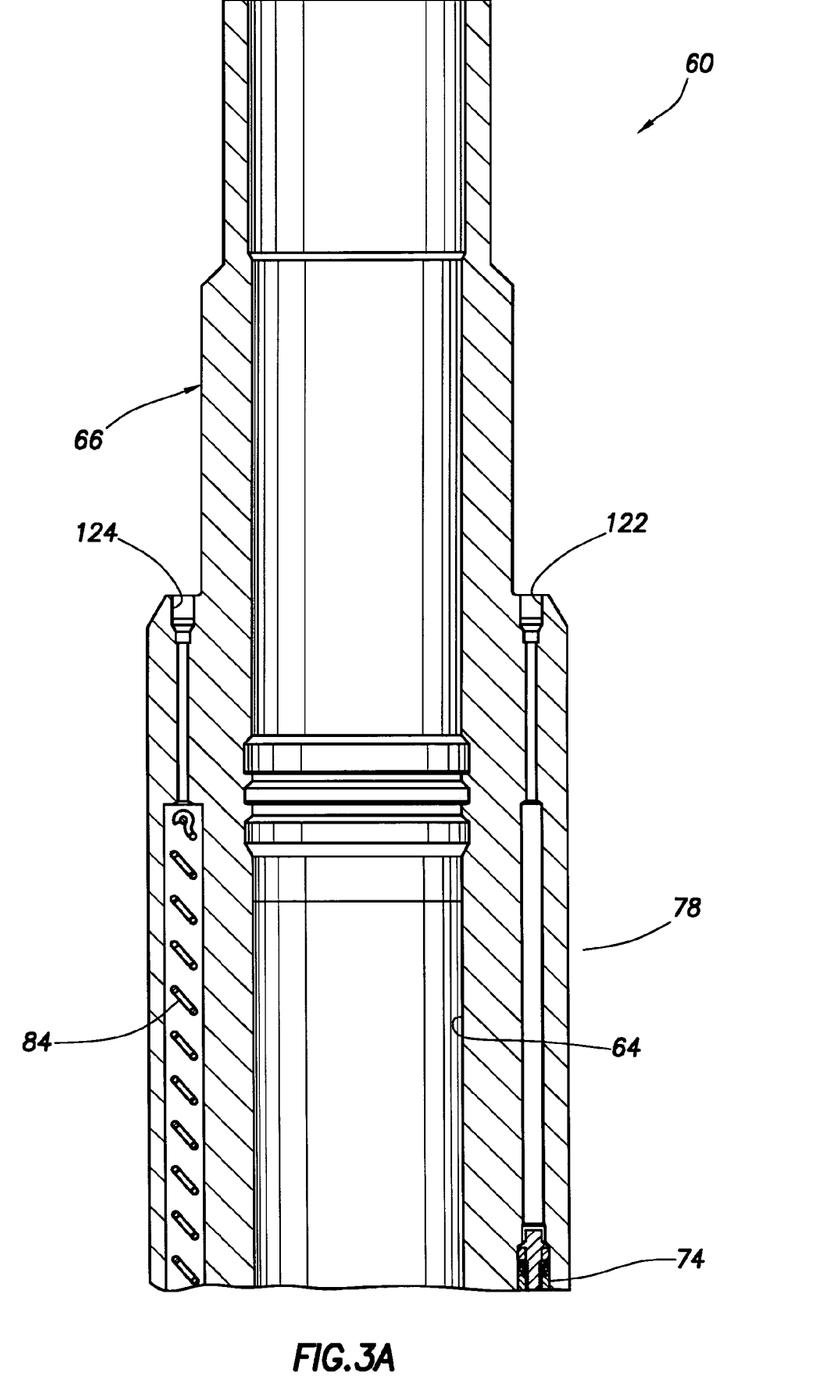
FIGS. 3A-D are cross-sectional views of successive axial sections of another safety valve which may be used in the system of FIG. 1, the safety valve embodying principles of the present invention.
Figure 3B:
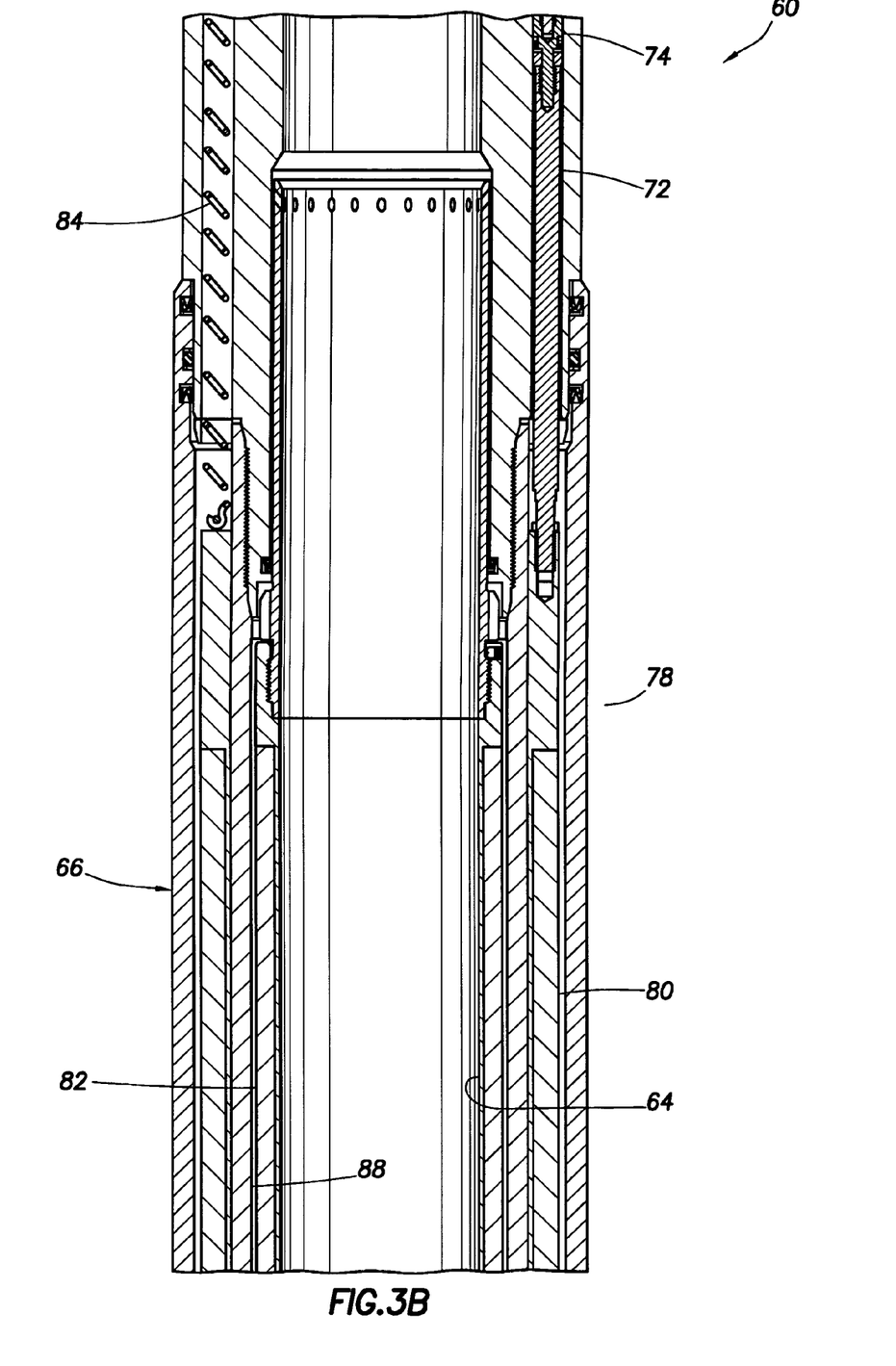
Figure 3C:
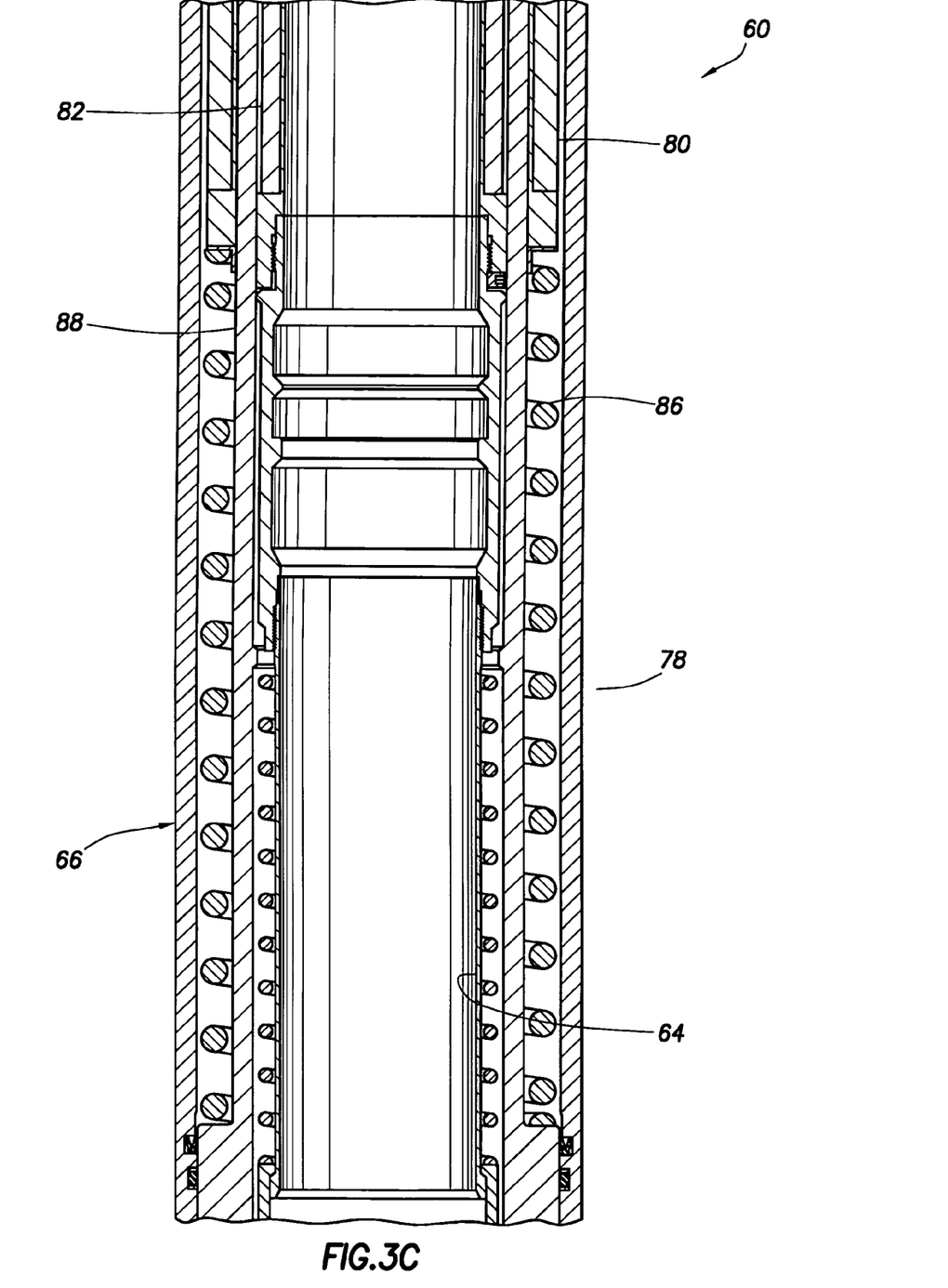
Figure 3D:
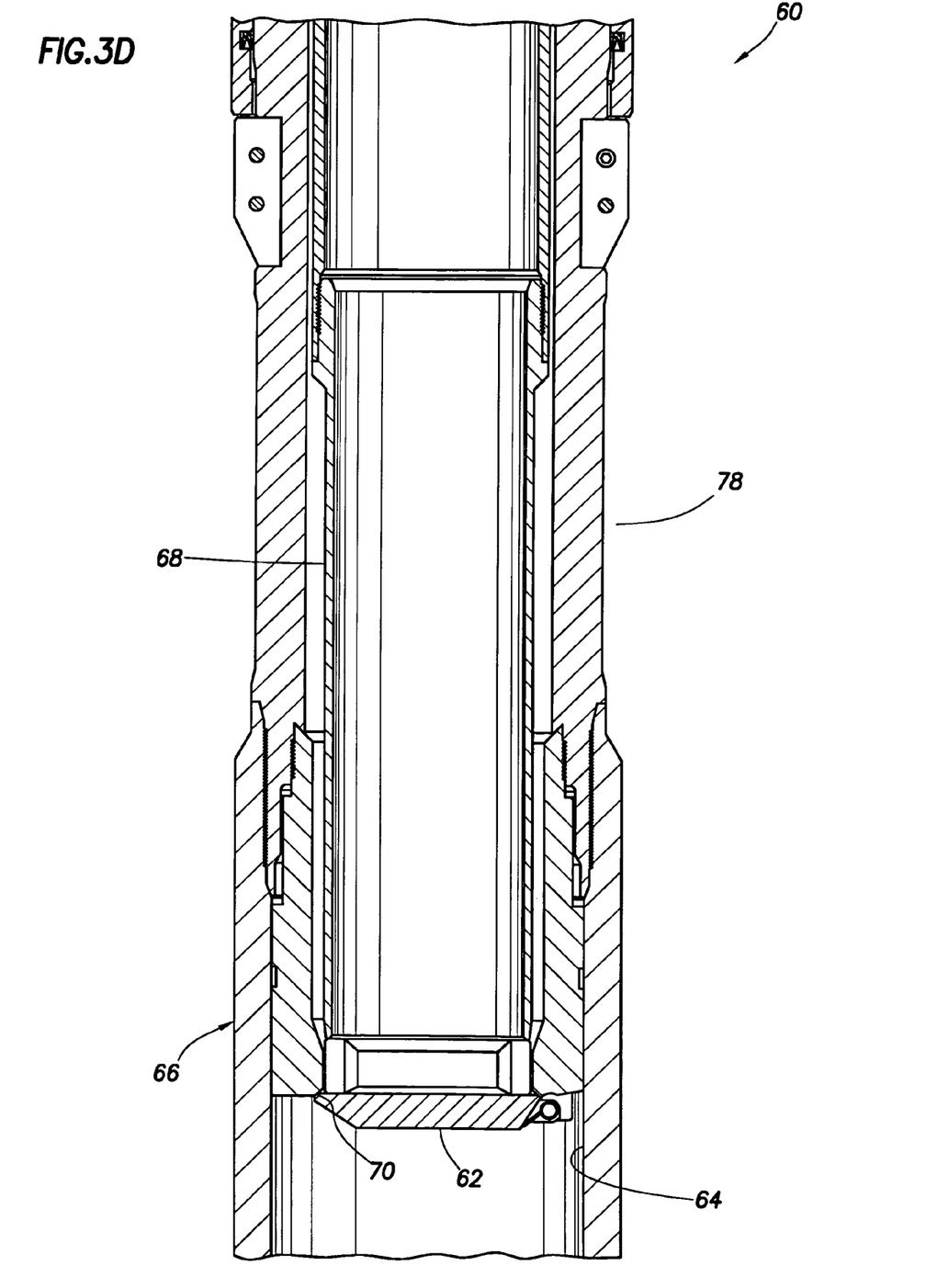

The safety valve 60 is similar in many respects to the safety valve 30 described above. A flapper closure member 62 is used to permit or prevent flow through a longitudinal flow passage 64 formed through a housing assembly 66. A flow tube structure 68 is displaced downwardly to pivot the flapper 62 to its open position. The flapper 62 pivots upward to sealingly engage a seat 70 when the flow tube 68 is in its upwardly disposed position as depicted in FIG. 3D.

One difference between the safety valves 60 and 30 is that a piston assembly 72 of the safety valve 60 includes a piston 74, an upper side of which is exposed to pressure in a first line (such as one of the lines 20 of FIG. 1) via a first port 122 in the housing assembly 66, and a lower side of which is exposed to pressure in a second line (such as another one of the lines 20) via a second port 124. The first line would be known to those skilled in the art as a control line, and the second line would be known to those skilled in the art as a balance line.

Pressure in the control line is increased to apply a pressure differential across the piston assembly 72 to apply a downwardly directed biasing force to one or more annular-shaped magnets 80. The magnets 80 are magnetically coupled to another set of one or more annular-shaped magnets 82 attached to the flow tube 68. The magnets 80, 82 displace together (due to their magnetic coupling) and so, as the piston assembly 72 displaces the magnets 80, the flow tube 68 is also displaced.

Pressure in the annulus 78 is isolated from pressure in the flow passage 64 by a wall 88, which also separates the magnets 80, 82. This is similar to the manner in which magnets are used to transmit displacement across a pressure-bearing wall as described in U.S. Patent Application Publication No. 2003/0155131, the entire disclosure of which is incorporated herein by this reference.

An extension spring biasing device 84 is attached between the housing assembly 66 and the magnets 80. The spring 84 applies an increasing upwardly directed biasing force to the magnets 80 as the magnets displace downwardly, since a length of the spring increases as the magnets displace downwardly. The length of the spring 84 decreases as the magnets 80 displace upwardly. As with the safety valve 30 described above, any type and any number of biasing devices may be used instead of, or in addition to, the spring 84 in keeping with the principles of the invention.

The safety valve 60 also uses a compression spring biasing device 86 to apply an upwardly directed biasing force to the magnets 80. Thus, both the compression spring 86 and the extension spring 84 (via the coupling between the magnets 80, 82) apply the upwardly directed biasing force to the flow tube 68. Any number and any type of biasing devices may be used instead of, or in addition to, the compression spring 86 in keeping with the principles of the invention.

Figure 4:
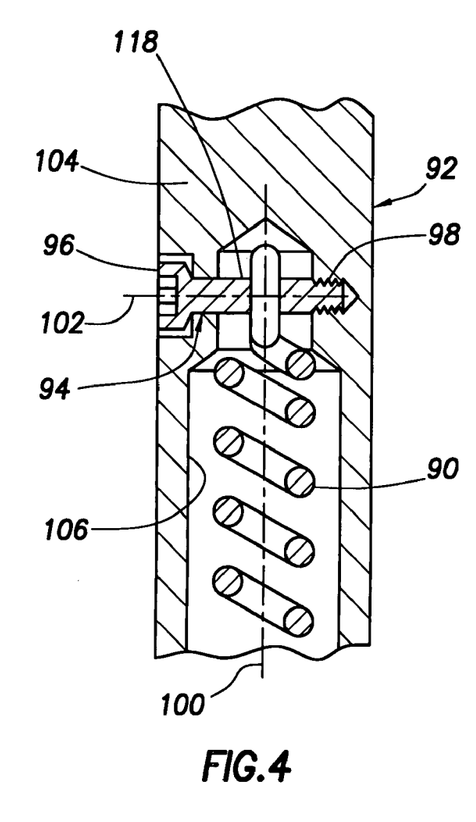
FIGS. 4-6 are further enlarged scale schematic cross-sectional views of alternate methods of attaching extension springs in the safety valves of FIGS. 2A-3D.
Figure 5:
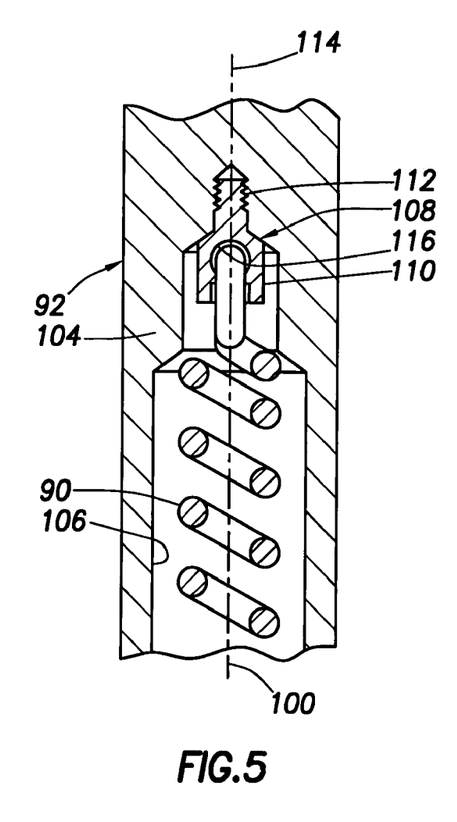
Figure 6:
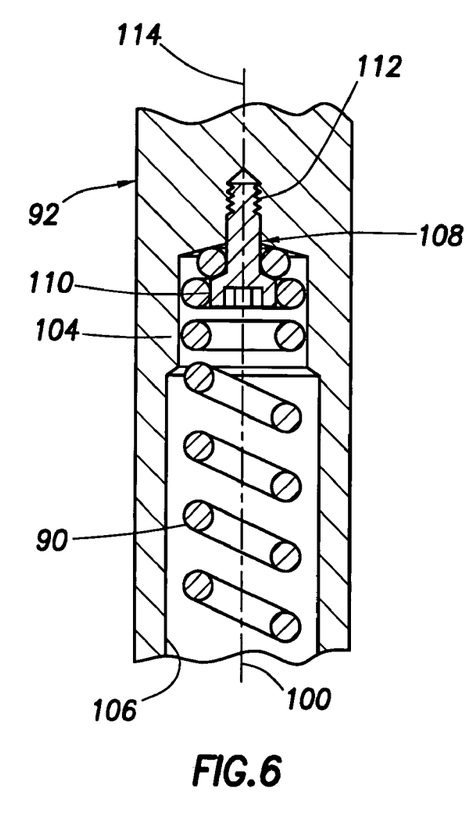

Referring additionally now to FIGS. 4-6, alternate methods of attaching an extension spring biasing device 90 to a housing assembly 92 are representatively illustrated. These same methods could be used to attach the biasing device 90 to a flow tube (such as the flow tubes 40, 68), to one or more magnets (such as the magnets 82), or to any other structure in keeping with the principles of the invention.

In FIG. 4, an end of the spring 90 is attached to a fastener 94 between a head 96 and a threaded end 98 of the fastener. The fastener 94 is threaded laterally into a sidewall 104 of the housing assembly 92, where it intersects an opening 106 in which the spring 90 is disposed. The end of the spring 90 is looped or hooked about a cylindrical member 118 of the fastener 94. In this case, a longitudinal axis 100 of the spring 90 is generally perpendicular to a longitudinal axis 102 of the fastener 94.

In FIG. 5, an end of the spring 90 is attached to a fastener 108 between a head 110 and a threaded end 112 of the fastener. However, in this case the fastener 108 is threaded into the sidewall 104 of the housing assembly 92 via the opening 106, and so a longitudinal axis 114 of the fastener is inline with the longitudinal axis 100 of the opening 106. The end of the spring 90 is looped or hooked through an opening 116 formed laterally through the fastener 108. The opening 116 could instead be formed through the head 110 or any other portion of the fastener 108.

In FIG. 6, the fastener 108 is threaded into the housing assembly 92 in a similar manner to that depicted in FIG. 5. However, instead of using the opening 116 to attach the spring 90, an end of the spring is compressed between the head 110 of the fastener 108 and the housing assembly 92. It will, thus, be appreciated that any method of attaching a biasing device may be used in keeping with the principles of the invention.

Of course, a person skilled in the art would, upon a careful consideration of the above description of representative embodiments of the invention, readily appreciate that many modifications, additions, substitutions, deletions, and other changes may be made to these specific embodiments, and such changes are contemplated by the principles of the present invention. Accordingly, the foregoing detailed description is to be clearly understood as being given by way of illustration and example only, the spirit and scope of the present invention being limited solely by the appended claims and their equivalents.

What is claimed is:

1. A valve for use in a subterranean well, the valve comprising:
    a housing assembly;
    a closure member having open and closed positions;
    a tubular structure which displaces to cause the closure member to displace between the open and closed positions; and
    a biasing device having a length which decreases as the structure displaces to cause the closure member to displace toward the closed position, the biasing device being attached at one end thereof to the structure and at another end thereof to the housing assembly, and the biasing device thereby applying to the structure and the housing assembly a biasing force which increases as the length of the biasing device increases.

2. The valve of claim 1, further comprising a flow passage extending generally longitudinally through the valve, the flow passage extending through the structure.

3. The valve of claim 1, wherein the closure member is a flapper pivotably received in the housing assembly of the valve.

4. The valve of claim 1, wherein the biasing device is an extension spring.

5. The valve of claim 1, wherein multiple biasing devices are circumferentially distributed in the housing assembly of the valve.

6. The valve of claim 5, wherein each of the biasing devices is received in a respective one of multiple openings formed in a sidewall of the housing assembly.

7. A valve for use in a subterranean well, the valve comprising:
    a housing assembly;
    a closure member having open and closed positions;
    a structure which displaces to cause the closure member to displace between the open and closed positions, the structure comprising a flow tube reciprocably received in the housing assembly of the valve; and
    a biasing device having a length which decreases as the structure displaces to cause the closure member to displace toward the closed position, the biasing device being attached at one end thereof to the structure and at another end thereof to the housing assembly, and the biasing device thereby applying to the structure and the housing assembly a biasing force which increases as the length of the biasing device increases.

8. A valve for use in a subterranean well, the valve comprising:
    a housing assembly;
    a closure member having open and closed positions;
    a structure which displaces to cause the closure member to displace between the open and closed positions;
    a biasing device having a length which decreases as the structure displaces to cause the closure member to displace toward the closed position, the biasing device being attached at one end thereof to the structure and at another end thereof to the housing assembly, and the biasing device thereby applying to the structure and the housing assembly a biasing force which increases as the length of the biasing device increases; and a piston attached to the structure, a pressure differential across the piston being operative to increase the biasing device length.

9. The valve of claim 8, wherein the piston and the biasing device are disposed in a generally tubular housing assembly sidewall at a same longitudinal position.

10. A safety valve for use in a subterranean well, the safety valve comprising:
 a housing assembly;
 a closure member having open and closed positions;
 a structure which is operative to displace the closure member between the open and closed positions; and
 multiple extension springs which bias the structure to displace the closure member toward the closed position, each spring being attached at one end thereof to the structure and at another end thereof to the housing assembly, and each spring thereby applying to the structure and the housing assembly a biasing force which increases as a length of each spring increases.

11. The safety valve of claim 10, wherein the length of each extension spring decreases when the structure displaces the closure member toward the closed position.

12. The safety valve of claim 10, wherein each extension spring is disposed in a sidewall of the housing assembly of the safety valve.

13. The safety valve of claim 12, wherein each extension spring is positioned in an opening formed in the housing assembly sidewall.

14. The safety valve of claim 12, wherein the extension springs are circumferentially distributed in the housing assembly sidewall.

15. The safety valve of claim 10, wherein an end of each extension spring encircles a cylindrical member attached to one of the structure and the housing assembly.

16. The safety valve of claim 10, wherein an end of each extension spring is attached between a threaded end of a fastener and a head of the fastener.

17. The safety valve of claim 16, wherein a longitudinal axis of the fastener is inline with a longitudinal axis of the respective extension spring.

18. The safety valve of claim 16, wherein a longitudinal axis of the fastener is perpendicular to a longitudinal axis of the respective extension spring.

19. The safety valve of claim 16, wherein the end of the respective extension spring is compressed between the head of the fastener and one of the structure and the housing assembly.

20. A safety valve for use in a subterranean well, the safety valve comprising:
 a housing assembly;
 a closure member having open and closed positions;
 a structure which is operative to displace the closure member between the open and closed positions, the structure comprising a flow tube, and wherein a longitudinal flow passage of the safety valve extends through the flow tube; and
 at least one extension spring which biases the structure to displace the closure member toward the closed position, the spring being attached at one end thereof to the structure and at another end thereof to the housing assembly, and the spring thereby applying to the structure and the housing assembly a biasing force which increases as a length of the spring increases.

21. The safety valve of claim 20, wherein the closure member is a flapper, and wherein the flow tube pivots the flapper away from a seat encircling the flow passage when the flow tube displaces the flapper toward the open position.

22. The safety valve of claim 21, wherein the extension spring elongates when the flow tube displaces the flapper toward the open position.

23. A safety valve for use in a subterranean well, the safety valve comprising:
 a housing assembly;
 a closure member having open and closed positions;
 a structure which displaces to thereby displace the closure member between the open and closed positions; and
 multiple biasing devices which bias the structure in a direction to thereby displace the closure member toward the closed position, a length of each biasing device decreasing as the structure displaces in the direction, each biasing device being attached at one end thereof to the structure and at another end thereof to the housing assembly, and each biasing device thereby applying to the structure and the housing assembly a biasing force which increases as the length of each biasing device increases.

24. The safety valve of claim 23, wherein the closure member displaces toward the closed position when the structure displaces in the direction.

25. The safety valve of claim 23, wherein each biasing device is disposed in a sidewall of the housing assembly of the safety valve.

26. The safety valve of claim 25, wherein each biasing device is positioned in an opening formed in the housing assembly sidewall.

27. The safety valve of claim 26, wherein the biasing devices are circumferentially distributed in the housing assembly sidewall.

28. The safety valve of claim 23, wherein the structure comprises a flow tube, and wherein a longitudinal flow passage of the safety valve extends through the flow tube.

29. The safety valve of claim 28, wherein the closure member is a flapper, and wherein the flow tube pivots the flapper away from a seat encircling the flow passage when the flow tube displaces the flapper toward the open position.

30. The safety valve of claim 29, wherein each biasing device elongates when the flow tube displaces the flapper toward the open position.

31. A safety valve for use in a subterranean well, the safety valve comprising:
 a housing assembly;
 a closure member having open and closed positions;
 a structure which displaces to thereby displace the closure member between the open and closed positions;
 a first biasing device which biases the structure in a direction to thereby displace the closure member toward the closed position, a length of the first biasing device decreasing as the structure displaces in the direction, the first biasing device being attached at one end thereof to the structure and at another end thereof to the housing assembly, and the first biasing device thereby applying to the structure and the housing assembly a biasing force which increases as the length of the first biasing device increases; and
 a second biasing device which biases the structure in the direction, a length of the second biasing device increasing as the structure displaces in the direction.

* * * * *